(12) United States Patent
Ishii

(10) Patent No.: US 8,414,135 B2
(45) Date of Patent: Apr. 9, 2013

(54) REFLECTOR FOR VEHICLE

(75) Inventor: Takeshi Ishii, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 267 days.

(21) Appl. No.: 12/858,039

(22) Filed: Aug. 17, 2010

(65) Prior Publication Data

US 2011/0044066 A1  Feb. 24, 2011

(30) Foreign Application Priority Data

Aug. 24, 2009  (JP) .................................. 2009-193432

(51) Int. Cl.
*G02B 5/124* (2006.01)

(52) U.S. Cl.
USPC ........................... 359/530; 359/533; 359/856

(58) Field of Classification Search .......... 359/529–533, 359/546–552, 842, 844, 856
See application file for complete search history.

(56) References Cited

U.S. PATENT DOCUMENTS

| RE29,396 | E | * | 9/1977 | Heenan | 204/281 |
| 4,703,999 | A | * | 11/1987 | Benson | 359/532 |
| 5,844,712 | A | | 12/1998 | Caroli | |
| 6,172,824 | B1 | * | 1/2001 | Lehmann et al. | 359/834 |
| 8,262,237 | B2 | * | 9/2012 | Smith | 359/530 |
| 2007/0258142 | A1 | * | 11/2007 | Couzin | 359/529 |
| 2009/0219618 | A1 | * | 9/2009 | Chipman et al. | 359/487 |
| 2012/0019910 | A1 | * | 1/2012 | Smith | 359/530 |

FOREIGN PATENT DOCUMENTS

JP  3340640 B2  11/2002

* cited by examiner

*Primary Examiner* — Frank Font
(74) *Attorney, Agent, or Firm* — Kenealy Vaidya LLP

(57) ABSTRACT

A reflector for a vehicle can include a plurality of retroreflective elements configured to retroreflect incident light incident parallel to a horizontally-arranged reference axis, obliquely upward at a prescribed angle with respect to the reference axis. The plurality of retroreflective elements can each include: a first reflection surface inclined at an angle ANG1 to the reference axis; a second reflection surface inclined at an angle ANG2 to the reference axis, and formed in a position reached after the second reflection surface is rotated from the first reflection surface through an angle ROT1 around the reference axis as a center; and a third reflection surface inclined at an angle ANG3 to the reference axis and formed in a position reached after the third reflection surface is rotated from the first reflection surface through an angle ROT2 around the reference axis as a center in a direction opposite to the second reflection surface, the first to third reflection surfaces arranged so as to form corners of a substantial cube, wherein a condition of following expressions is satisfied: ANG2>ANG3; ANG2>ANG1; and ROT1>ROT2>120 degrees.

8 Claims, 17 Drawing Sheets

OBSERVATION ANGLE (0.2° 0.33° 1.5°)

FIG. 7

OPTIMIZATION OF RR    BASIC ANGLE  35.264    120.000

2.3mm HEXAGONAL PIN

| TARGET | RR ANG1 | | | RR3 ANG2 | | | RR2 ANG3 | | | RR3_ROT ROT1 | | | RR2_ROT ROT2 | | | COMPARISON OF INCLINATION | COMPARISON OF ROTATIONAL ANGLE |
|---|---|---|---|---|---|---|---|---|---|---|---|---|---|---|---|---|---|
| 0.36 | 0.018 | | | 0.045 | | | 0.041 | | | 120.08 | | | 120.07 | | | ANG2>ANG3>ANG1 | ROT1>ROT2 |
| | 35.282 | | | 35.309 | | | 35.305 | | | 120 | 4 | 48 | 120 | 4 | 12 | | |
| | 35 | 16 | 55 | 35 | 18 | 32 | 35 | 18 | 18 | | | | | | | | |
| 0.33 | 0.009 | | | 0.046 | | | 0.041 | | | 120.07 | | | 120.06 | | | ANG2>ANG3>ANG1 | ROT1>ROT2 |
| | 35.273 | | | 35.310 | | | 35.305 | | | 120 | 4 | 12 | 120 | 3 | 36 | | |
| | 35 | 16 | 23 | 35 | 18 | 36 | 35 | 18 | 18 | | | | | | | | |
| 0.23 | 0.015 | | | 0.002 | | | 0.019 | | | 120.06 | | | 120.04 | | | ANG2>ANG3>ANG1 | ROT1>ROT2 |
| | 35.279 | | | 35.296 | | | 35.283 | | | 120 | 3 | 36 | 120 | 2 | 24 | | |
| | 35 | 16 | 44 | 35 | 17 | 46 | 35 | 16 | 50 | | | | | | | | |
| 0.20 | 0.021 | | | 0.036 | | | 0.000 | | | 120.07 | | | 120.03 | | | ANG2>ANG1>ANG3 | ROT1>ROT2 |
| | 35.285 | | | 35.300 | | | 35.264 | | | 120 | 4 | 12 | 120 | 1 | 48 | | |
| | 35 | 17 | 6 | 35 | 18 | 0 | 35 | 15 | 50 | | | | | | | | |
| 0.17 | 0.008 | | | 0.040 | | | 0.000 | | | 120.06 | | | 120.01 | | | ANG2>ANG1>ANG3 | ROT1>ROT2 |
| | 35.272 | | | 35.304 | | | 35.264 | | | 120 | 3 | 36 | 120 | 0 | 36 | | |
| | 35 | 16 | 19 | 35 | 18 | 14 | 35 | 15 | 50 | | | | | | | | |

FIG. 8A

RESULTS OF SIMULATION AT STANDARD POINTS (RESULTS OBTAINED WHEN 0.33-DEGREE PINS WERE ARRANGED ON THE WHOLE SURFACE)

| BEST PIN | | Cd | | | mcd/Lx | | |
|---|---|---|---|---|---|---|---|
| | MEASUREMENT POINT | 0.20 | 0.33 | 1.50 | 0.20 | 0.33 | 1.50 |
| Center | 10 DEG UP | 11.83 | 10.69 | 0.04 | 1099.44 | 993.49 | 3.72 |
| | 0 DEG | 14.61 | 13.09 | 0.05 | 1357.81 | 1216.54 | 4.65 |
| | 10 DEG DOWN | 11.89 | 10.76 | 0.04 | 1105.02 | 1000.00 | 3.72 |
| Left20 | 5 DEG UP | 3.76 | 3.17 | 0.00 | 349.44 | 294.61 | 0.00 |
| | 0 DEG | 4.42 | 4.28 | 0.02 | 410.78 | 397.77 | 1.86 |
| | 5 DEG DOWN | 4.22 | 4.32 | 0.10 | 392.19 | 401.49 | 9.29 |
| Right20 | 5 DEG UP | 3.78 | 3.19 | 0.00 | 351.30 | 296.47 | 0.00 |
| | 0 DEG | 4.38 | 4.24 | 0.02 | 407.06 | 394.05 | 1.86 |
| | 5 DEG DOWN | 4.26 | 4.34 | 0.10 | 395.91 | 403.35 | 9.29 |

FIG. 8B

| COMPARATIVE EXAMPLE | | Cd | | | mcd/Lx | | |
|---|---|---|---|---|---|---|---|
| | MEASUREMENT POINT | 0.20 | 0.33 | 1.50 | 0.20 | 0.33 | 1.50 |
| Center | 10 DEG UP | 11.69 | 10.54 | 0.04 | 1086.43 | 979.55 | 3.90 |
| | 0 DEG | 14.53 | 12.96 | 0.05 | 1350.37 | 1204.46 | 4.74 |
| | 10 DEG DOWN | 11.74 | 10.60 | 0.04 | 1091.08 | 985.13 | 3.72 |
| Left20 | 5 DEG UP | 3.67 | 3.16 | 0.00 | 341.08 | 293.68 | 0.00 |
| | 0 DEG | 4.25 | 4.17 | 0.02 | 394.98 | 387.55 | 1.86 |
| | 5 DEG DOWN | 3.95 | 3.99 | 0.11 | 367.10 | 370.82 | 10.22 |
| Right20 | 5 DEG UP | 3.70 | 3.17 | 0.00 | 343.87 | 294.61 | 0.00 |
| | 0 DEG | 4.23 | 4.14 | 0.02 | 393.12 | 384.76 | 1.86 |
| | 5 DEG DOWN | 3.99 | 4.02 | 0.10 | 370.82 | 373.61 | 9.29 |

FIG. 8C

| COMPARISON OF EFFICIENCY | | PERCENT (RATIO) | | |
|---|---|---|---|---|
| | MEASUREMENT POINT | 0.20 | 0.33 | 1.50 |
| Center | 10 DEG UP | 101.20% | 101.42% | 100.00% |
| | 0 DEG | 100.55% | 101.00% | 100.00% |
| | 10 DEG DOWN | 101.28% | 101.51% | 100.00% |
| Left20 | 5 DEG UP | 102.45% | 100.32% | — |
| | 0 DEG | 104.00% | 102.64% | 100.00% |
| | 5 DEG DOWN | 106.84% | 108.27% | 100.00% |
| Right20 | 5 DEG UP | 102.16% | 100.63% | — |
| | 0 DEG | 103.55% | 102.42% | 100.00% |
| | 5 DEG DOWN | 106.77% | 107.96% | 100.00% |

FIG. 9A

OPTIMIZATION OF RR    BASIC ANGLE 35.264    120.000
2.3mm HEXAGONAL PIN 0.33 DEGREE

| TARGET | RR ANG1 | | RR3 ANG2 | | RR2 ANG3 | | RR3_ROT ROT1 | | RR2_ROT ROT2 | | ERROR (mm) | ANGLE DIFFERENCE (Deg.) |
|---|---|---|---|---|---|---|---|---|---|---|---|---|
| BEST | 0.009 35.273 | 35 18 | 0.046 35.310 | 35 18 | 0.041 35.305 | 35 18 | 120.07 120 | 4 12 | 120.06 120 | 3 18 | 3.715 | 0.007 |
| RR1 (-0.02) | 0.0110 35.275 | 35 16 | 0.0480 35.312 | 35 18 | 0.0430 35.307 | 35 18 | 120.07 120 | 4 12 | 120.06 120 | 3 18 | 24.806 | 0.047 |
| RR1 (-0.02) | 0.0070 35.271 | 35 16 | 0.0440 35.308 | 35 18 | 0.0390 35.303 | 35 18 | 120.07 120 | 4 12 | 120.06 120 | 3 18 | 17.446 | 0.037 |
| RR (-0.0027) | 0.0117 35.278 | 35 18 | 0.0487 35.313 | 35 18 | 0.0437 35.308 | 35 18 | 120.07 120 | 4 12 | 120.06 120 | 3 18 | 32.474 | 0.061 |
| RR (-0.0027) | 0.0083 35.270 | 35 16 | 0.0433 35.307 | 35 18 | 0.0383 35.302 | 35 18 | 120.07 120 | 4 12 | 120.06 120 | 3 18 | 27.180 | 0.051 |

FIG. 9B

RELATED ART

RELATED ART

RELATED ART

REFLECTOR FOR VEHICLE

CROSS-REFERENCE TO RELATED APPLICATIONS

This application claims the priority benefit under 35 U.S.C. §119 of Japanese Patent Application No. 2009-193432 filed on Aug. 24, 2009, which is hereby incorporated in its entirety by reference.

BACKGROUND

1. Field

The presently disclosed subject matter relates to a reflector for a vehicle and, more particularly, to a reflector for a vehicle which allows increasing the luminous intensity at a measurement point for obtaining the luminous intensity in the direction of an observation angle.

2. Description of the Related Art

In the field of vehicle reflectors, it has been desired to increase the luminous intensity in the direction of an observation angle. In order to increase the luminous intensity in the direction of an observation angle, for example, the reflector for vehicle described in Japanese Patent No. 3340640 has been proposed.

As illustrated in FIGS. 14 and 15, the reflector for a vehicle described in Japanese Patent No. 3340640 includes a plurality of retroreflective elements 211 configured to retroreflect incident light, which becomes incident parallel to a horizontally arranged reference axis AX, in a direction inclined at a prescribed angle to the reference axis AX. The retroreflective element 211 includes a first reflection surface 1, a second reflection surface 2 and a third reflection surface 3 which are arranged in an adjoining relation so as to form corners of a substantial cube (see FIG. 15). Each of the reflection surfaces 1 to 3 is inclined at the same angle (approximately 35° 17') to the reference axis AX which is horizontally arranged (see FIG. 14), and each of the second reflection surface 2 and the third reflection surface 3 is formed in positions reached after the second reflection surface 2 and the third reflection surface 3 are each rotated through the same angle (±120° 6') around the reference axis AX as center (see FIG. 15).

In the reflector for a vehicle 210 according to the above-described configuration, the incident light which becomes incident parallel to the reference axis AX, reflects obliquely upward at a prescribed angle to the reference axis AX due to the action of a retroreflective element (the first to third reflection surfaces 1 to 3). As illustrated in FIG. 16, focusing points P2 and P3 on both sides approach the topmost focusing point P1. Therefore, it becomes possible to increase the luminous intensity at measurement points for obtaining luminous intensity in the direction of an observation angle.

SUMMARY

The inventor of the presently disclosed subject matter has performed studies in order to increase the luminous intensity at measurement points for obtaining the luminous intensity in the direction of an observation angle compared to the conventional or related art. As a result, the inventor has determined that when five parameters, which include: a first inclination angle (ANG1), a second inclination angle (ANG2), a third inclination angle (ANG3), a downward rotational angle (ROT1) and an upward rotational angle (ROT2), satisfy the relationships described below, the luminous intensity at measurement points found in accordance with a standard for a reflex reflector reaches a maximum so that it becomes possible to obtain a higher luminous intensity than provided by conventional systems, such as those described in Japanese Patent No. 3340640:

$$ANG2 > ANG3 \tag{1}$$

$$ANG2 > ANG1 \tag{2}$$

$$ROT1 > ROT2 > 120 \text{ degrees} \tag{3}$$

In the above expressions, the first inclination angle (ANG1) is an inclination angle between a first reflection surface and a reference axis AX, the second inclination angle (ANG2) is an inclination angle between a second reflection surface and the reference axis AX, the third inclination angle (ANG3) is an inclination angle between a third reflection surface and the reference axis AX, the downward rotational angle (ROT1) is a rotational angle of the second reflection surface from the reference surface (the first reflection surface), which is obtained when the rotation is performed around the reference axis as a center, and the upward rotational angle (ROT2) is a rotational angle of the third reflection surface from the reference surface (the first reflection surface), which is obtained when the rotation is performed around the reference axis as a center.

The presently disclosed subject matter was made on the basis of the above-described knowledge, and the presently disclosed subject matter can be configured to provide a reflector for vehicle which makes it possible to further increase the luminous intensity at a measurement point for obtaining the luminous intensity in the direction of an observation angle, and a reflex pin which can constitute the reflector for vehicle of the presently disclosed subject matter.

To solve the above-described problem and address other concerns and issues, a first aspect of the presently disclosed subject matter can include a reflector for a vehicle, the reflector having a plurality of retroreflective elements configured to retroreflect incident light, which becomes incident parallel to a reference axis arranged along a horizontal direction, obliquely upward at a prescribed angle to the reference axis, the plurality of retroreflective elements each including: a first reflection surface which is inclined at a first inclination angle ANG1 to the reference axis; a second reflection surface which is inclined at a second inclination angle ANG2 to the reference axis and is formed in a position reached after the second reflection surface is rotated from the first reflection surface through a first rotational angle ROT1 around the reference axis as a center; and a third reflection surface which is inclined at a third inclination angle ANG3 to the reference axis and is formed in a position reached after the third reflection surface is rotated from the first reflection surface through a second rotational angle ROT2 around the reference axis as a center in a direction opposite to the second reflection surface, wherein the first, second and third reflection surfaces are arranged in adjoining relation so as to substantially form corners of a cube, and the first inclination angle ANG1, the second inclination angle ANG2, the third inclination angle ANG3, the first rotational angle ROT1 and the second rotational angle ROT2 satisfy the relationships below:

ANG2>ANG3;

ANG2>ANG 1;

and

ROT1>ROT2>120 degrees.

According to the first aspect, the five parameters which include the first inclination angle, the second inclination angle, the third inclination angle, the first rotational angle and the second rotational angle are each set so that the angle conditions of ANG2>ANG3, ANG2>ANG1, and ROT1>ROT2>120 degrees are satisfied (in the related art, substantially two parameters alone are set) and, therefore, it becomes possible to further increase the luminous intensity at measurement points where the luminous intensity in the direction of an observation angle is found, as compared to the related art.

A second aspect of the presently disclosed subject matter provides a reflector for a vehicle according to the first aspect, wherein the prescribed angle is 0.33 degrees.

According to the second aspect, by satisfying the angle conditions of ANG2>ANG3, ANG2>ANG1, and ROT1>ROT2>120 degrees, it becomes possible to further increase the luminous intensity at measurement points where the luminous intensity in the direction of an observation angle (0.33 degrees) is found, as compared to the related art.

A third aspect of the presently disclosed subject matter provides a reflector for a vehicle according to the second aspect, wherein the first inclination angle ANG1 is 35.273 degrees±0.0027 degrees, the second inclination angle ANG2 is 35.310 degrees±0.0027 degrees, the third inclination angle ANG3 is 35.305 degrees±0.0027 degrees, the first rotational angle ROT1 is 120.07 degrees±0.0027 degrees, and the second rotational angle ROT2 is 120.06 degrees±0.0027 degrees.

According to the third aspect, even when the first inclination angle ANG1 is set in the range of 35.273 degrees±0.0027 degrees, the second inclination angle ANG2 is set in the range of 35.310 degrees±0.0027 degrees, the third inclination angle ANG3 is set in the range of 35.305 degrees±0.0027 degrees, the first rotational angle ROT1 is set in the range of 120.07 degrees±0.0027 degrees, and the second rotational angle ROT2 is set in the range of 120.06 degrees±0.0027 degrees, the deviation of ray tracing is kept within 20% and, therefore, it becomes possible to configure a reflector for a vehicle in which ray tracing accuracy does not deviate greatly with respect to actual scattering phenomena and shape changes.

A fourth aspect of the presently disclosed subject matter provides a reflex pin including an end portion configured to form a retroreflective element which retroreflects incident light, which becomes incident parallel to a reference axis which is arranged along a horizontal direction, obliquely upward at a prescribed angle to the reference axis, the end portion including: a first inclined surface which is inclined at a first inclination angle ANG1 to a central axis of a reflex pin; a second inclined surface which is inclined at a second inclination angle ANG2 to the central axis of the reflex pin and is formed in a position reached after the second inclined surface is rotated from the first inclined surface through a first rotational angle ROT1 around the central axis of the reflex pin as center; and a third inclined surface which is inclined at a third inclination angle ANG3 to the central axis of the reflex pin and is formed in a position reached after the third inclined surface is rotated from the first inclined surface through a second rotational angle ROT2 around the central axis of the reflex pin as center in a direction opposite to the second inclined surface, wherein the first, second and third reflection surfaces are arranged in adjoining relation so as to substantially form corners of a cube, and the first inclination angle ANG1, the second inclination angle ANG2, the third inclination angle ANG3, the first rotational angle ROT1 and the second rotational angle ROT2 satisfy the relationships below:

ANG2>ANG3;

ANG2>ANG 1;

and

ROT1>ROT2>120 degrees.

According to the fourth aspect, the five parameters, including the first inclination angle, the second inclination angle, the third inclination angle, the first rotational angle and the second rotational angle are each set so that the angle conditions of ANG2>ANG3, ANG2>ANG1, and ROT1>ROT2>120 degrees are satisfied (in the related art, substantially two parameters alone are set) and, therefore, it becomes possible to form a retroreflective element capable of further improving the luminous intensity at measurement points where the luminous intensity in the direction of an observation angle is found, compared to the related art.

A fifth aspect of the presently disclosed subject matter provides a reflector for a vehicle including a plurality of retroreflective elements configure to retroreflect incident light, which becomes incident parallel to a reference axis which is arranged along a horizontal direction, obliquely upward at a prescribed angle to the reference axis, the plurality of retroreflective elements each including: a first reflection surface which is inclined at a first inclination angle to the reference axis; a second reflection surface which is inclined at a second inclination angle to the reference axis and is formed in a position reached after the second reflection surface is rotated from the first reflection surface through a first rotational angle around the reference axis as center; and a third reflection surface which is inclined at a third inclination angle to the reference axis and is formed in a position reached after the third reflection surface is rotated from the first reflection surface through a second rotational angle around the reference axis as center in a direction opposite to the second reflection surface, wherein the first reflection surface, the second reflection surface and the third reflection surface are arranged in adjoining relation so as to form corners of a substantial cube, and the first inclination angle, the second inclination angle, the third inclination angle, the first rotational angle and the second rotational angle are each individually adjusted so that the luminous intensity at measurement points for obtaining the luminous intensity in accordance with a standard for reflex reflectors, becomes a maximum.

According to the fifth aspect, the five parameters of the first inclination angle, the second inclination angle, the third inclination angle, the first rotational angle and the second rotational angle are each set so that the luminous intensity at measurement points where the luminous intensity is found in accordance with a standard for reflex reflectors becomes a maximum (in the related art, substantially two parameters alone are set) and, therefore, it becomes possible to further increase the luminous intensity at measurement points where the luminous intensity in the direction of an observation angle is found, compared to the related art.

According to the presently disclosed subject matter, it becomes possible to provide a reflector for vehicle capable of further increasing the luminous intensity at a measurement point for obtaining the luminous intensity in the direction of an observation angle, and a reflex pin capable of forming this reflector for vehicle.

BRIEF DESCRIPTION OF THE DRAWINGS

FIG. 7 illustrates an example in which five parameters (the first inclination angle α1, the second inclination angle α2, the third inclination angle α3, the downward rotational angle β1, and the upward rotational angle β2) are each individually adjusted so that the luminous intensity at a plurality of measurement points, where the luminous intensity is obtained in accordance with a standard for a reflex reflector, becomes a maximum at each of the observation angles of 0.17 degrees, 0.20 degrees, 0.23 degrees, 0.33 degrees and 0.36 degrees;

FIG. 8A is a table illustrating luminous intensity at each measurement point obtained when the observation angle is 0.20 degrees and 0.33 degrees, the first inclination angle α1, the second inclination angle α2, the third inclination angle α3, the downward rotational angle β1, and the upward rotational angle β2 are given in FIG. 7, respectively. FIG. 8B is a table of a comparative example illustrating the luminous intensity at each measurement point obtained when the first inclination angle α1, the second inclination angle α2, the third inclination angle α3, the downward rotational angle β1, and the upward rotational angle β2 are 35° 17', 35° 17', 35° 17', 120° 6' and 120° 6', respectively. FIG. 8C is a table illustrating the efficiency of the example illustrated in FIG. 8A as compared to the example illustrated in FIG. 8B;

FIGS. 9A and 9B are tables illustrating errors and angle differences occurring when the angle conditions (the first inclination angle α1=35.273 degrees, the second inclination angle α2=35.310 degrees, the third inclination angle α3=35.305 degrees, the first rotational angle β1=120.07 degrees, and the second rotational angle (β2=120.06 degrees) in the case of the observation angle of 0.33 degrees are changed by ±0.0002 or ±0.0027;

FIGS. 13A and 13B are diagrams illustrating the positional relationship of a reflector for a vehicle, a light source, a vertical screen S, an observation angle R, focusing points P1 to P3 and the like;

DETAILED DESCRIPTION OF EXEMPLARY EMBODIMENTS

Hereinafter, embodiments of a reflector for a vehicle according to the disclosed subject matter will be described with reference to the drawings.

Figure 1:
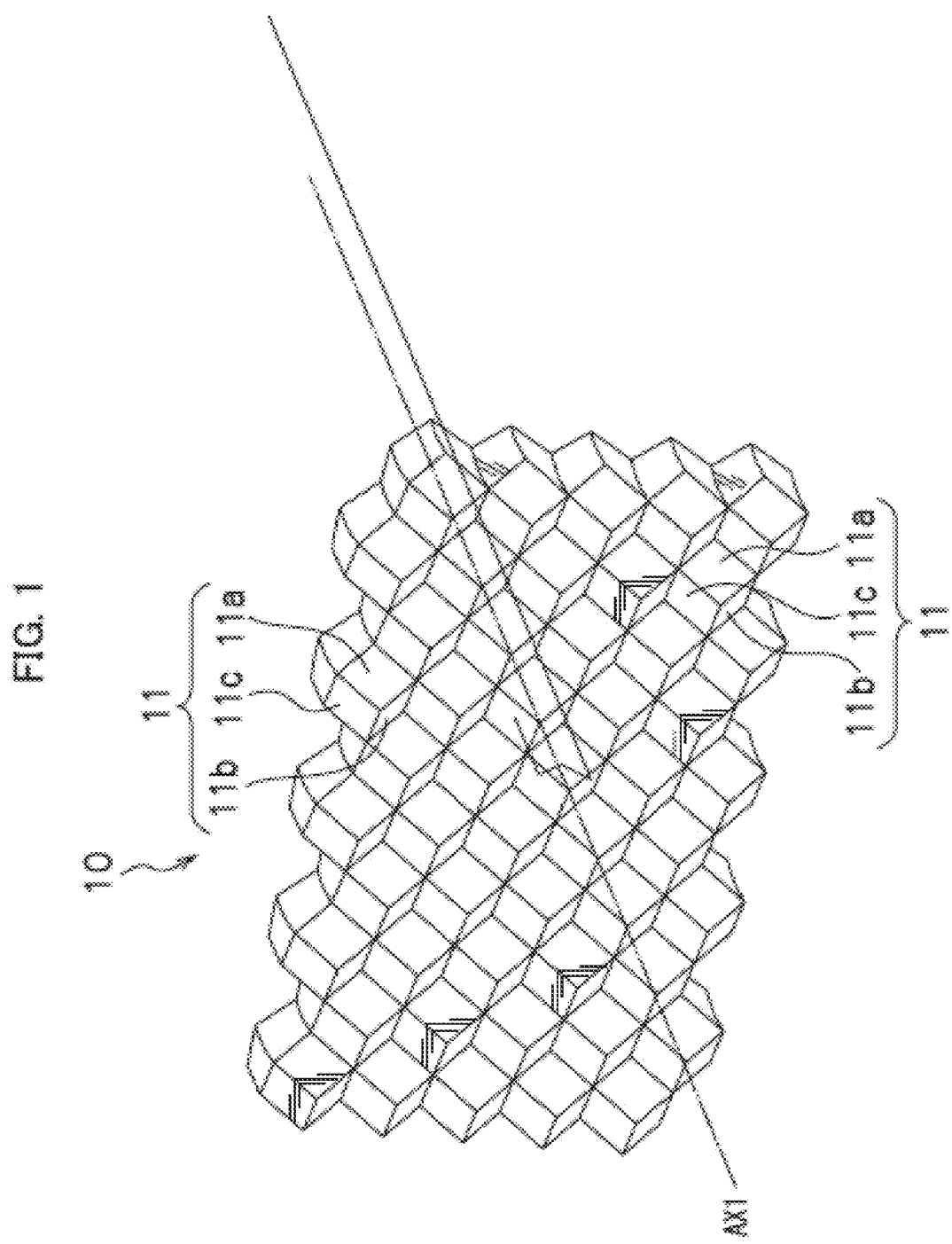
FIG. 1 is a perspective view (rear side) of an embodiment of a reflector for a vehicle made in accordance with principles of the presently disclosed subject matter.
Figure 2:
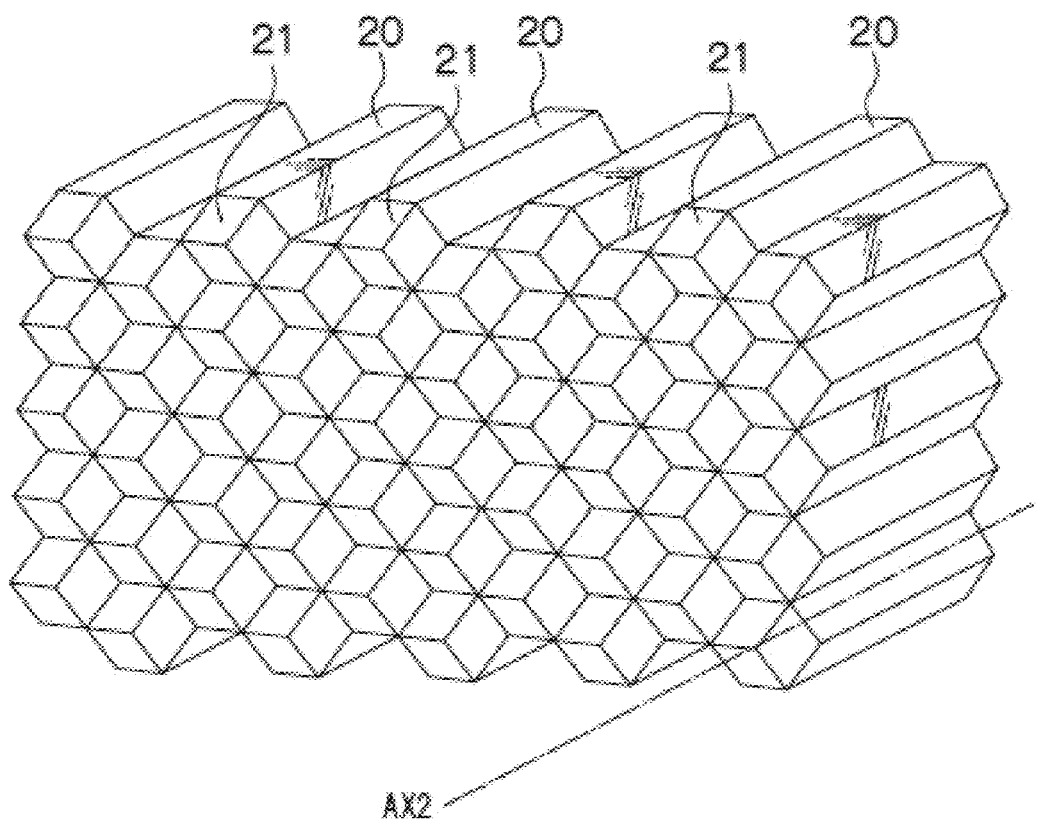
FIG. 2 is a perspective view of a reflex pin which is used in forming the reflector illustrated in FIG. 1.

FIG. 1 shows a reflector for a vehicle 10 which is referred to as a reflex reflector and which can be attached to vehicles, such as automobiles, trucks, SUVs, ATVs, and motorcycles. The reflector 10 can be formed from transparent materials, such as acrylics and polycarbonates. As illustrated in FIG. 1, the reflector 10 can include a front surface upon which irradiated light from surrounding vehicles and the like becomes incident, a rear surface on the opposite side of the front surface, and a plurality of retroreflective elements 11 composed of a plurality of reflex pins 20 (end portions 21) on the rear surface side as illustrated in FIG. 2.

Retroreflective Element

Figure 3:
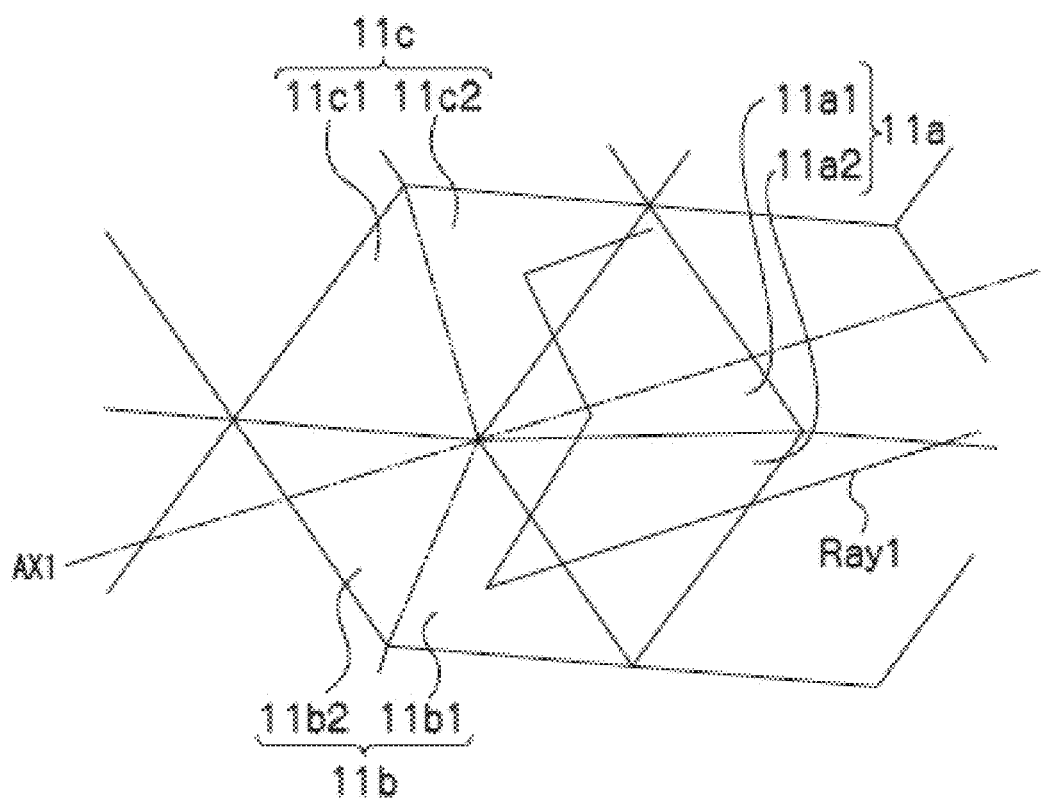
FIG. 3 is a partially enlarged view of the reflector (a retroreflective element) illustrated in FIG. 1.

As illustrated in FIGS. 1 and 3, a retroreflective element 11 can include a horizontal surface 11a (corresponding to the first reflection surface of the presently disclosed subject matter), a downward surface 11b (corresponding to the second reflection surface of the presently disclosed subject matter) which is arranged on the lower side in the vertical direction, and an upward surface 11c (corresponding to the third reflection surface of the presently disclosed subject matter) which is arranged on the upper side in the vertical direction. Each of these surfaces 11a to 11c can be arranged in adjoining relation so as to form corners (also called corner cubes) of a substantial cube.

Figure 13B:
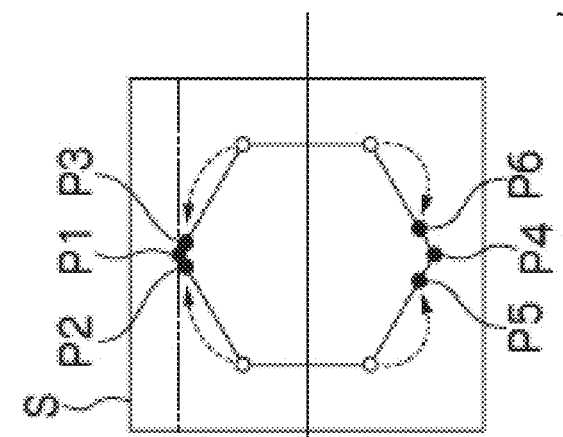
Figure 13A:
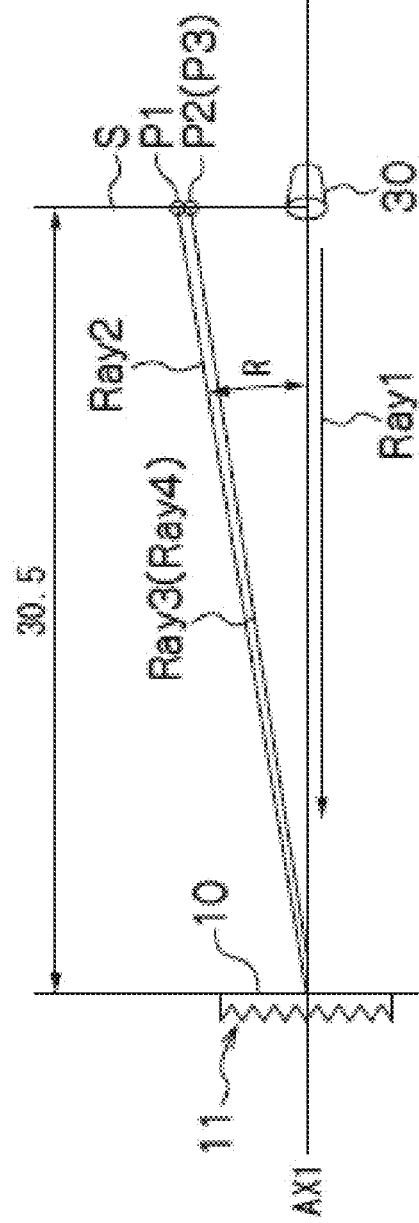
Figure 14:
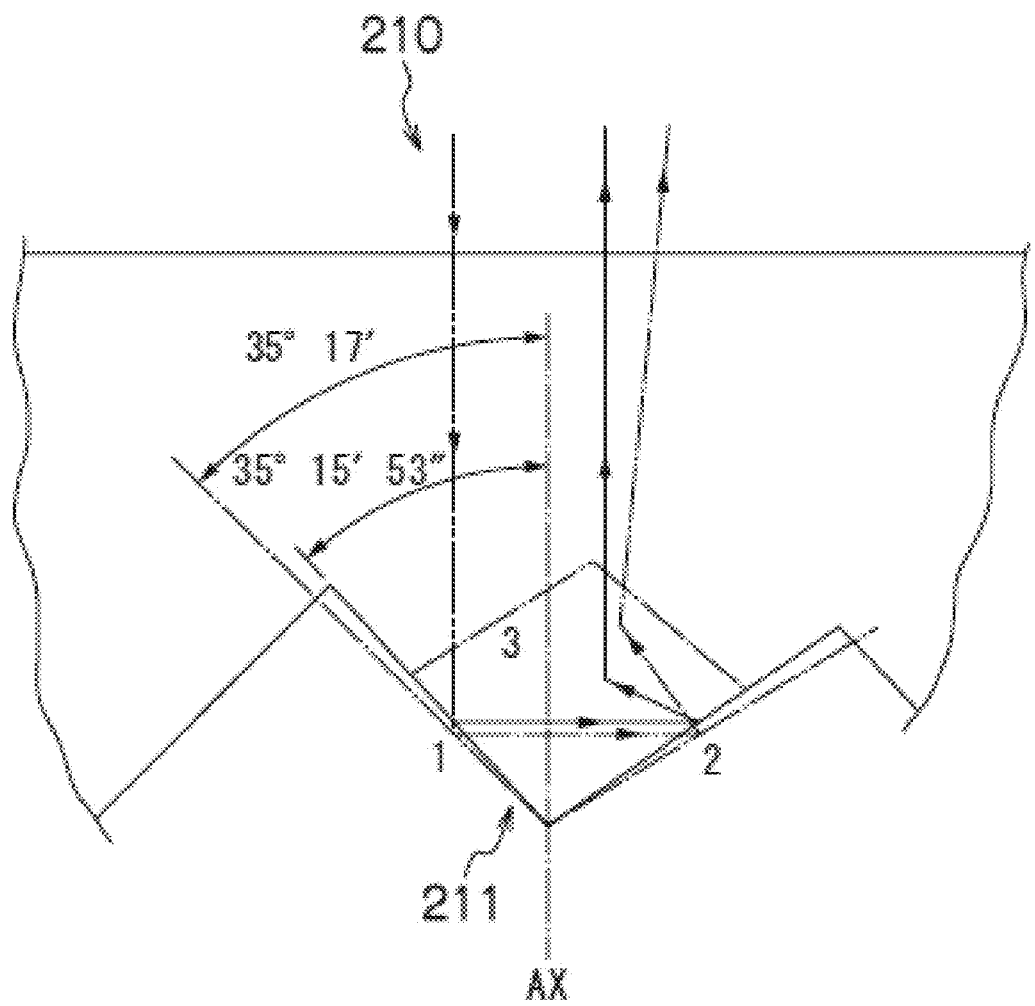
FIG. 14 is a diagram illustrating the configuration of a retroreflective element formed in a reflector for a vehicle according to the related art.
Figure 15:
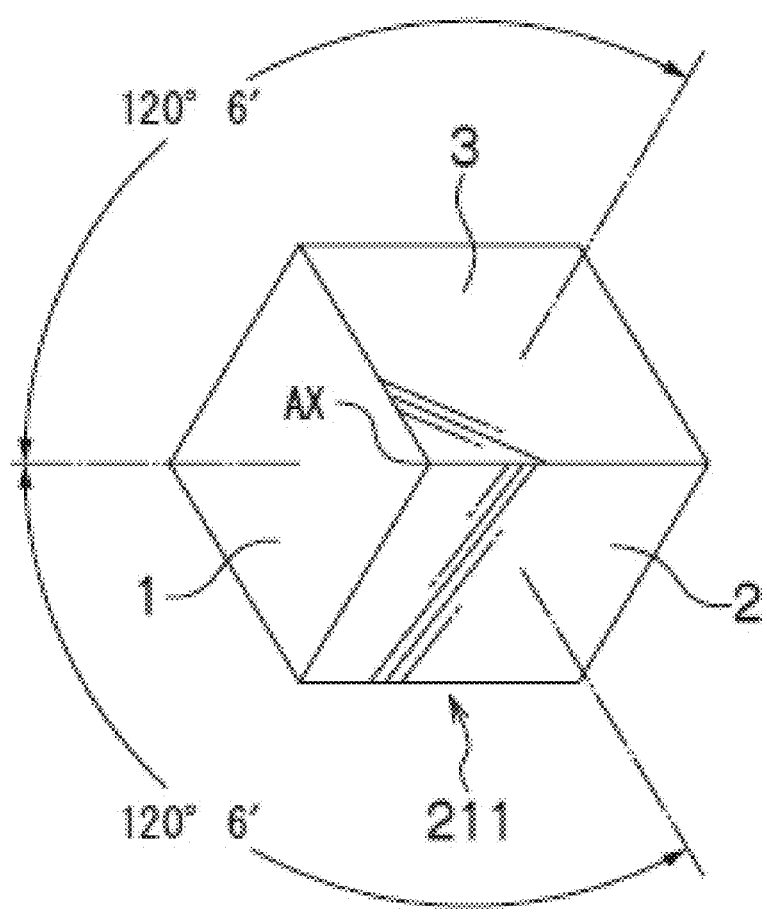
FIG. 15 is a diagram illustrating the configuration of a retroreflective element formed in a reflector for a vehicle according to the related art.

As illustrated in FIGS. 3 and 13A, a ray of light, Ray1, is radiated from a light source 30 and is parallel to a reference axis AX1 (corresponding to a central axis AX2 of the reflex pin 20) which is horizontally arranged. The ray of light Ray1 becomes incident on the retroreflective element 11, and retroreflects on each of the surfaces 11a to 11c (for example, reflects three times in all, as illustrated in FIG. 3), and is reflected in directions corresponding to each of regions 11a1 to 11c2 of each of the surfaces 11a to 11c upon which the light became incident (in the three directions in which the light travels obliquely upward with respect to the reference axis AX1 and the three directions in which the light travels obliquely downward with respect to the reference axis AX1). Among the rays of the reflected light, rays of light Ray2 to Ray4 travel obliquely upward with respect to the reference axis AX1 in three directions and focus on topmost point P1 and points P2 and P3 on both lower sides thereof (see FIG. 13B). The rays of the reflected light in three directions which travel obliquely downward with respect to the reference axis AX1 focus on bottommost point P4 and points P5 and P6 on both upper sides thereof (see FIG. 13B).

In an embodiment of the disclosed subject matter, the inventor adjusted a total of five parameters, each individually, which are the first inclination angle α1, the second inclination angle α2, the third inclination angle α3, the downward rotational angle β1 (corresponding to the first rotational angle of the presently disclosed subject matter), and the upward rotational angle β2 (corresponding to the second rotational angle of the presently disclosed subject matter), and has observed points P1 to P3 where the reflected light in three directions which travels obliquely upward with respect to the reference axis AX1 focus. The following determinations have been made: the first inclination angle α1 is an angle of the surface 11a to the reference axis AX1, the second inclination angle $\alpha 2$ is an angle of the downward surface 11b to the reference axis AX1, the third inclination angle $\alpha 3$ is an angle of the upward surface 11c to the reference axis AX1, the downward rotational angle $\beta 1$ is an angle of the downward surface 11b from a reference surface (the horizontal surface 11a), which is obtained when the rotation is performed around the reference axis AX1 as center, and the upward rotational angle $\beta 2$ is an angle of the upward surface 11c from the reference surface (the surface 11a), which is obtained when the rotation is performed around the reference axis AX1 as a center.

Figure 4A:
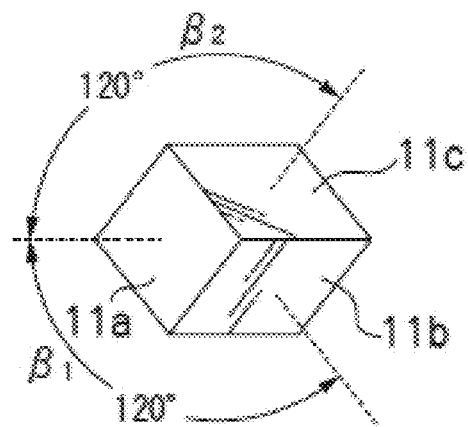
FIGS. 4A and 4B are configuration diagrams of general retroreflective elements.
Figure 4B:
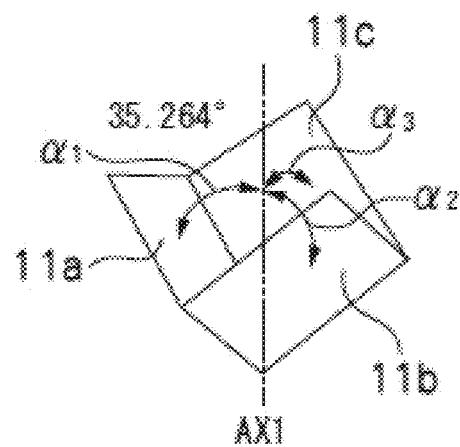
Figure 4C:
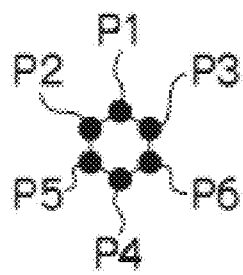
FIG. 4C is a diagram illustrating focusing points P1 to P6 formed by general retroreflective elements.
Figure 5A:
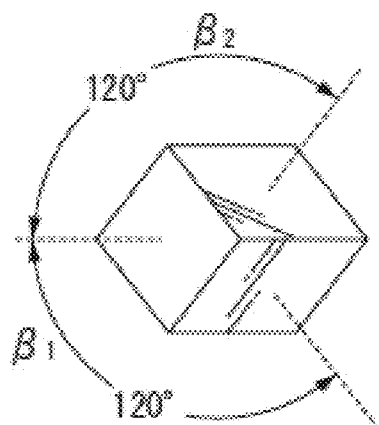
FIGS. 5A to 5C are diagrams which illustrate that by adjusting the first inclination angle α1, the second inclination angle α2 and the third inclination angle α3, it is possible to adjust the vertical positions of points P2 and P3.
Figure 5B:
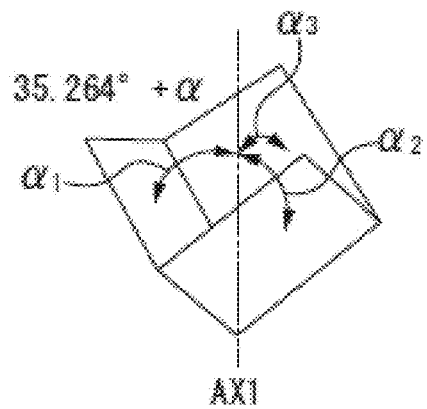
Figure 5C:
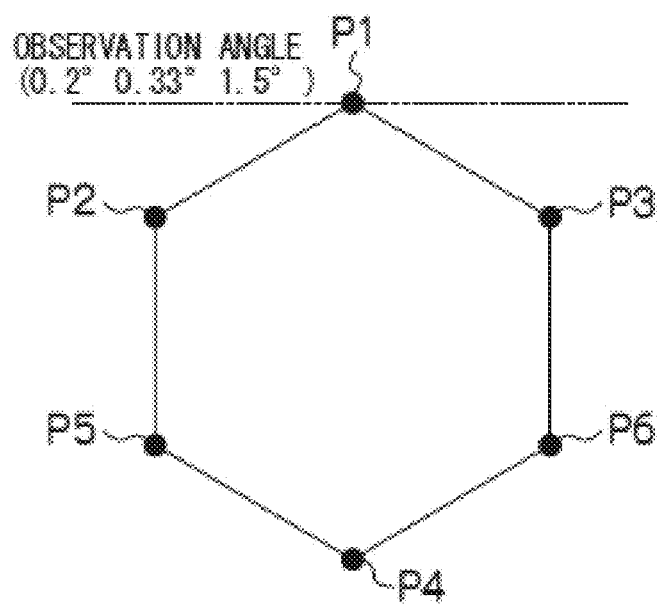

Thus, when the first inclination angle $\alpha 1$, the second inclination angle $\alpha 2$, and the third inclination angle $\alpha 3$ are increased, points P2 and P3 on both sides approach the topmost point P1 side (see FIG. 13B). More specifically, by adjusting the first inclination angle $\alpha 1$, the second inclination angle $\alpha 2$, and the third inclination angle $\alpha 3$, it is possible to adjust the vertical positions of points P2 and P3 (see FIGS. 4C and 5C).

Figure 6A:
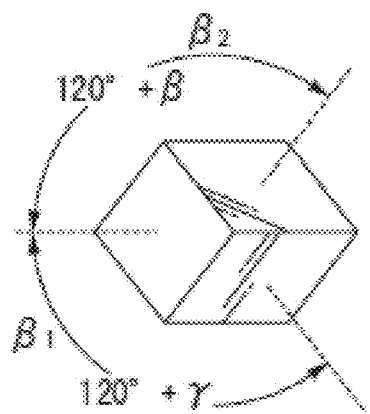
FIGS. 6A to 6C are diagrams which illustrate that by adjusting the downward rotational angle β1 and the upward rotational angle β2, points P1 to P3 on which the reflected light in three directions which travels obliquely upward with respect to the reference axis AX1 focuses, approach an observation angle.
Figure 6B:
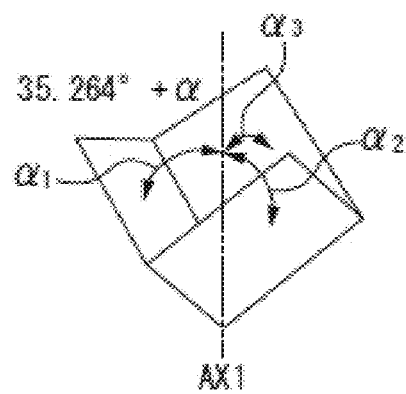
Figure 6C:
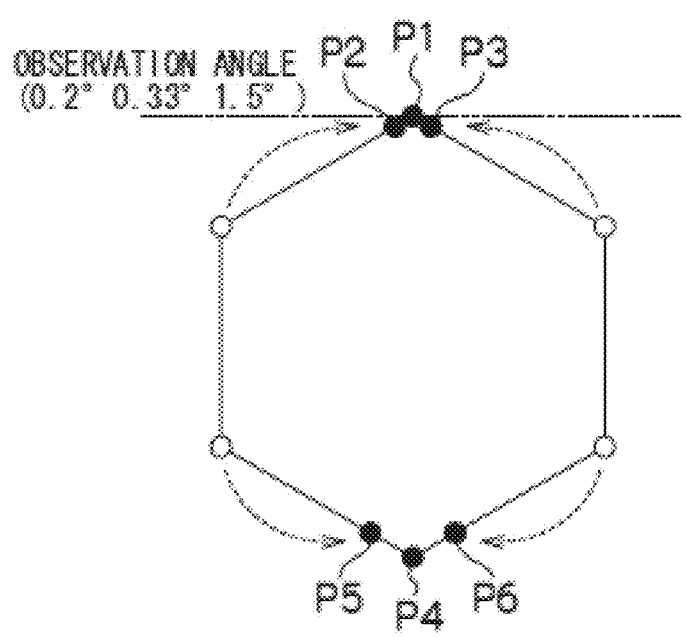

Furthermore, by adjusting the downward rotational angle $\beta 1$ and the upward rotational angle $\beta 2$, points P1 to P3 where the rays of the reflected light R2 to R4 in three directions which travel obliquely upward with respect to the reference axis AX1 focus, approach the observation angle (see FIG. 6C). At the same time, points P4 to P6 where the rays of the reflected light in three directions which travel obliquely downward with respect to the reference axis AX1 focus, are distributed in a range wider than the range of points P1 to P3 (see FIG. 6C).

On the basis of the above-described knowledge, the inventor of the presently disclosed subject matter has adjusted a total of five parameters, each individually, which are a first inclination angle $\alpha 1$, a second inclination angle $\alpha 2$, a third inclination angle $\alpha 3$, a downward rotational angle $\beta 1$, and an upward rotational angle $\beta 2$, and the inventor has examined the angle conditions under which the luminous intensity found in accordance with a standard for a reflex reflector (SAE J594f: Society of Automotive Engineers) at measurement points (Center: 10 DEG UP, 0 DEG, 10 DEG DOWN, Left20: 5 DEG UP, 0 DEG, 5 DEG DOWN, Right: 5 DEG UP, 0 DEG, 5 DEG DOWN on a vertical screen S arranged in a position 30.5 meters away from the light source 30) becomes a maximum (i.e., becomes optimized).

As a result, the inventor has found that when the following expressions are satisfied, the luminous intensity at the measurement points where the luminous intensity is found in accordance with a standard for reflex reflectors (SAE J594f), becomes a maximum (i.e., becomes optimized):

$$ANG2 > ANG3 \quad (1)$$

$$ANG2 > ANG1 \quad (2)$$

$$ROT1 > ROT2 > 120 \text{ degrees} \quad (3)$$

In the relationships described above, ANG1 denotes the first inclination angle $\alpha 1$, ANG2 denotes the second inclination angle $\alpha 2$, ANG3 denotes the third inclination angle $\alpha 3$, ROT1 denotes the first rotational angle $\beta 1$, and ROT2 denotes the second rotational angle $\beta 2$.

FIG. 7 illustrates an example in which five parameters (the first inclination angle $\alpha 1$, the second inclination angle $\alpha 2$, the third inclination angle $\alpha 3$, the downward rotational angle $\beta 1$, and the upward rotational angle $\beta 2$) have been each individually adjusted for each of the observation angles of 0.17 degrees, 0.20 degrees, 0.23 degrees, 0.33 degrees and 0.36 degrees, so that the luminous intensity at a plurality of measurement points, which is found in accordance with a standard for reflex reflectors (SAE J594f), becomes a maximum (i.e., becomes optimized).

Referring to FIG. 7, it is apparent that at all of the observation angles of 0.17 degrees, 0.20 degrees, 0.23 degrees, 0.33 degrees and 0.36 degrees, i.e., in the range of $0.17 \leq$ (observation angle)$\leq 0.36$, the angle conditions of conditions (1) to (3) above are satisfied.

Figure 16:
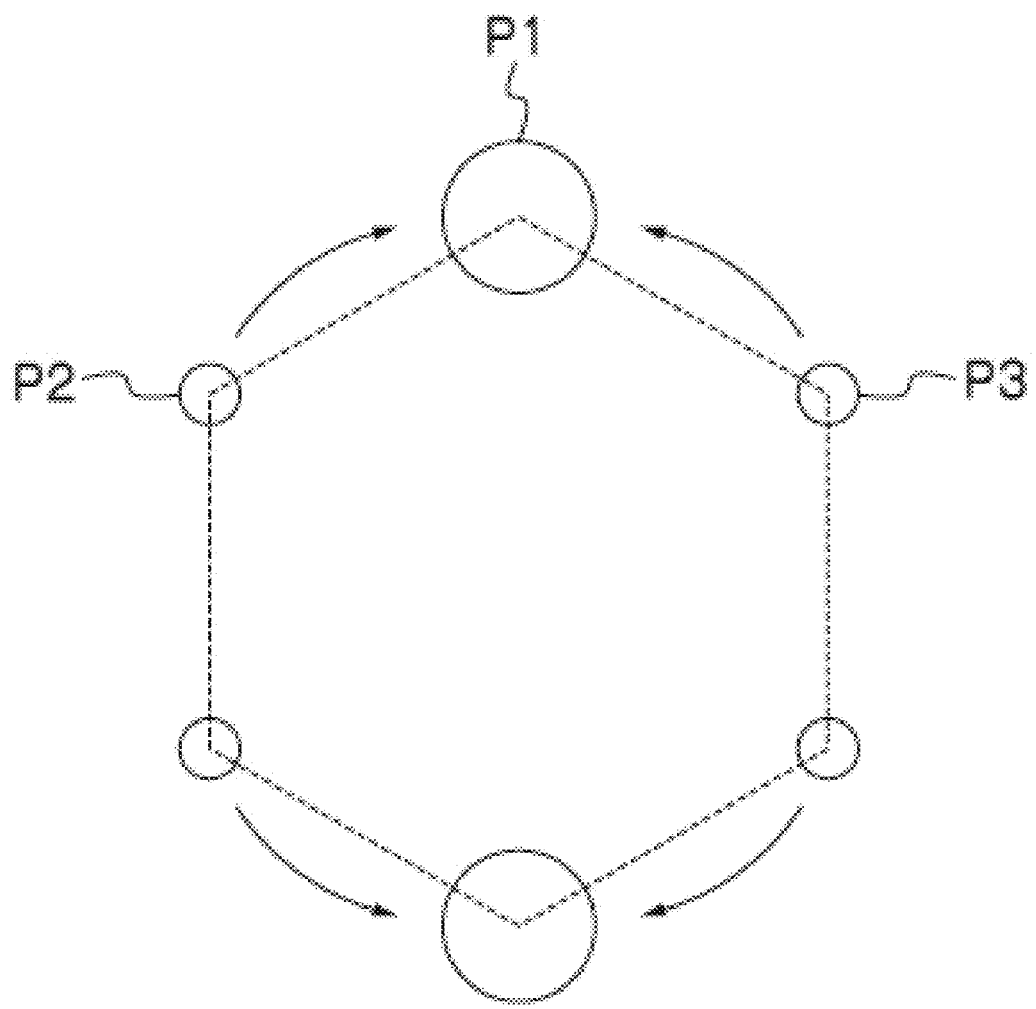
FIG. 16 is a diagram illustrating points P1 to P3 on which reflected light travels obliquely upward with respect to a reference axis and focuses in a reflector for vehicle (a retroreflective element) according to the related art.

According to FIGS. 7 and 13B, it is apparent that at the observation angle of 0.33 degrees, when the first inclination angle $\alpha 1 = 35.273$ degrees, the second inclination angle $\alpha 2 = 35.310$ degrees, the third inclination angle $\alpha 3 = 35.305$ degrees, the first rotational angle $\beta 1 = 120.07$ degrees, and the second rotational angle $\beta 2 = 120.06$ degrees, points P2 and P3 on both sides approach the topmost point P1 side to a greater extent(see FIG. 13B) than in related art (see FIG. 16) and that the luminous intensity at the measurement points becomes a maximum (i.e., becomes optimized).

Similarly, it is apparent that at the observation angle of 0.20 degrees, when the first inclination angle $\alpha 1 = 35.285$ degrees, the second inclination angle $\alpha 2 = 35.304$ degrees, the third inclination angle $\alpha 3 = 35.264$ degrees, the first rotational angle $\beta 1 = 120.06$ degrees, and the second rotational angle $\beta 2 = 120.01$ degrees, the luminous intensity at each of the measurement points becomes a maximum (i.e., becomes optimized).

FIG. 8A is a table illustrating the luminous intensity at the measurement points obtained when the observation angle is 0.20 degrees and 0.33 degrees, the first inclination angle $\alpha 1$, the second inclination angle $\alpha 2$, the third inclination angle $\alpha 3$, the downward rotational angle $\beta 1$, and the upward rotational angle $\beta 2$ are the angles given in FIG. 7, respectively.

FIG. 8B is a table of a comparative example illustrating the luminous intensity at the measurement points obtained when the first inclination angle $\alpha 1$, the second inclination angle $\alpha 2$, the third inclination angle $\alpha 3$, the downward rotational angle $\beta 1$, and the upward rotational angle $\beta 2$ are 35° 17', 35° 17', 35° 17', 120° 6' and 120° 6', respectively.

FIG. 8C is a table illustrating the efficiency of the example illustrated in FIG. 8A compared to the comparative example illustrated in FIG. 8B. According to FIG. 8C, it is apparent that in both cases of the observation angle of 0.33 degrees and 0.20 degrees, the efficiency of the comparative example is exceeded. In the case that the observation angle is 0.33 degrees and 0.20 degrees, it is apparent that by satisfying the angle conditions of Expressions (1) to (3) above, it becomes possible to configure the reflector 10 to have a better efficiency than in the comparative example.

Figure 9B:
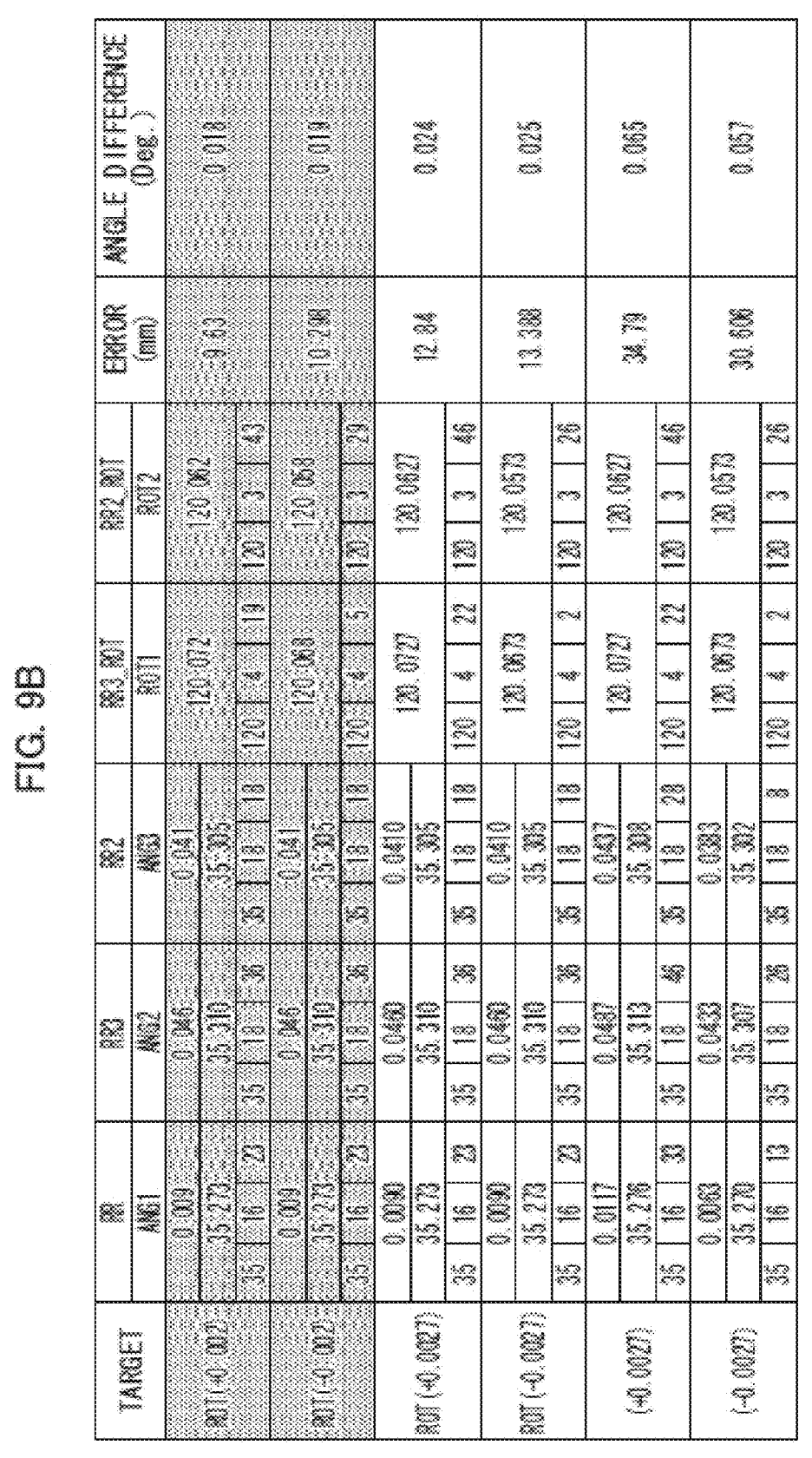

FIGS. 9A and 9B are tables illustrating errors and angle differences occurring when the angle conditions (the first inclination angle $\alpha 1 = 35.273$ degrees, the second inclination angle $\alpha 2 = 35.310$ degrees, the third inclination angle $\alpha 3 = 35.305$ degrees, the first rotational angle $\beta 1 = 120.07$ degrees, and the second rotational angle $\beta 2 = 120.06$ degrees) in the case of the observation angle of 0.33 degrees are changed by ±0.0002 or ±0.0027. According to FIGS. 9A and 9B, in the case of the observation angle of 0.33 degrees, the deviation of ray tracing is kept within 20% if the first inclination angle $\alpha 1$ is in the range of 35.282 degrees±0.0027 degrees, the second inclination angle $\alpha 2$ is in the range of 35.310 degrees±0.0027 degrees, the third inclination angle $\alpha 3$ is in the range of 35.305 degrees±0.0027 degrees, the first rotational angle 131 is in the range of 120.07 degrees±0.0027 degrees, and the second rotational angle $\beta 2$ is in the range of 120.06 degrees±0.0027 degrees, and hence it is apparent that ray tracing accuracy does not deviate greatly with respect to actual scattering phenomena and shape changes.

As described above, according to the reflector 10 (and the retroreflective element 11) of this embodiment, the five parameters of the first inclination angle $\alpha 1$, the second inclination angle α2, the third inclination angle α3, the first rotational angle β1 and the second rotational angle β2 are each set so that the angle conditions of ANG2>ANG3, ANG2>ANG1, and ROT1>ROT2>120 degrees are satisfied and, therefore, points P2 and P3 on both sides approach the topmost point P1 side to a greater extent than in the related art (see FIG. 13B).

As a result of this, it becomes possible to further increase the luminous intensity at the measurement points for obtaining the luminous intensity in accordance with a standard for reflex reflectors (SAE J594f) (Center: 10 DEG UP, 0 DEG, 10 DEG DOWN, Left20: 5 DEG UP, 0 DEG, 5 DEG DOWN, Right: 5 DEG UP, 0 DEG, 5 DEG DOWN on a vertical screen S arranged in a position about 30.5 meters away from the light source 30), compared to the related art (see FIG. 8C).

Reflex Pin

Next, a description will be given of the reflex pin 20 used to form the above-described retroreflective element 11.

Figure 10:
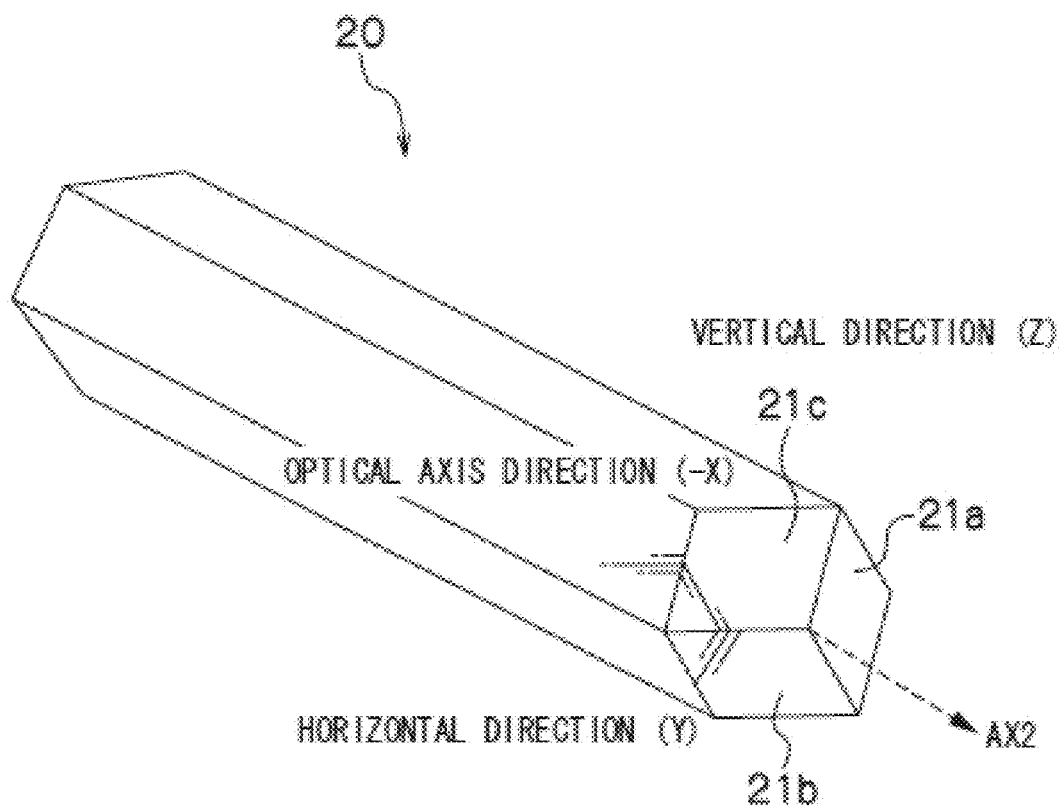
FIG. 10 is a perspective view of a reflex pin (a hexagonal pin) used to form a reflector for the vehicle illustrated in FIG. 1.

As illustrated in FIG. 10, the reflex pin 20 can include a surface 21a (corresponding to the first reflection surface of the presently disclosed subject matter), a downward surface 21b (corresponding to the second reflection surface of the presently disclosed subject matter), and an upward surface 21c (corresponding to the third reflection surface of the presently disclosed subject matter), which are formed at the end portion 21 of the reflex pin 20, and each of these surfaces 21a to 21c is arranged in an adjoining relation so as to form corners (also called corner cubes) of a substantial cube.

The surface 21a is inclined at the first inclination angle α1 to the central axis AX2 extending in the longitudinal direction of the reflex pin 20, the downward surface 21b is inclined at the second inclination angle α2 to the central axis AX2 and is formed in a position reached after the downward surface 21b is rotated from a reference surface (the surface 21a) through the first rotational angle β1 around the central axis AX2 as center, and the upward surface 21c is inclined at the third inclination angle α3 to the central axis AX2 and is formed in a position reached after the upward surface 21c is rotated from the reference surface (the surface 21a) through the second rotational angle β2 around the central axis AX2 as center in a direction opposite to the downward surface 21b. Each of the surfaces 21a to 21c is set so that the angle relationships given by Expressions (1) to (3) are satisfied.

FIG. 10 is an example of a reflex pin 20 in which each of the surfaces 21a to 21c is formed substantially to a square and the sectional shape perpendicular to the central axis AX2 is a hexagonal shape. This reflex pin 20 is assembled as illustrated in FIG. 2, for example, and is used to form a reflector for a vehicle in which a plurality of retroreflective elements 11 are arranged as illustrated in FIG. 1.

Figure 11:
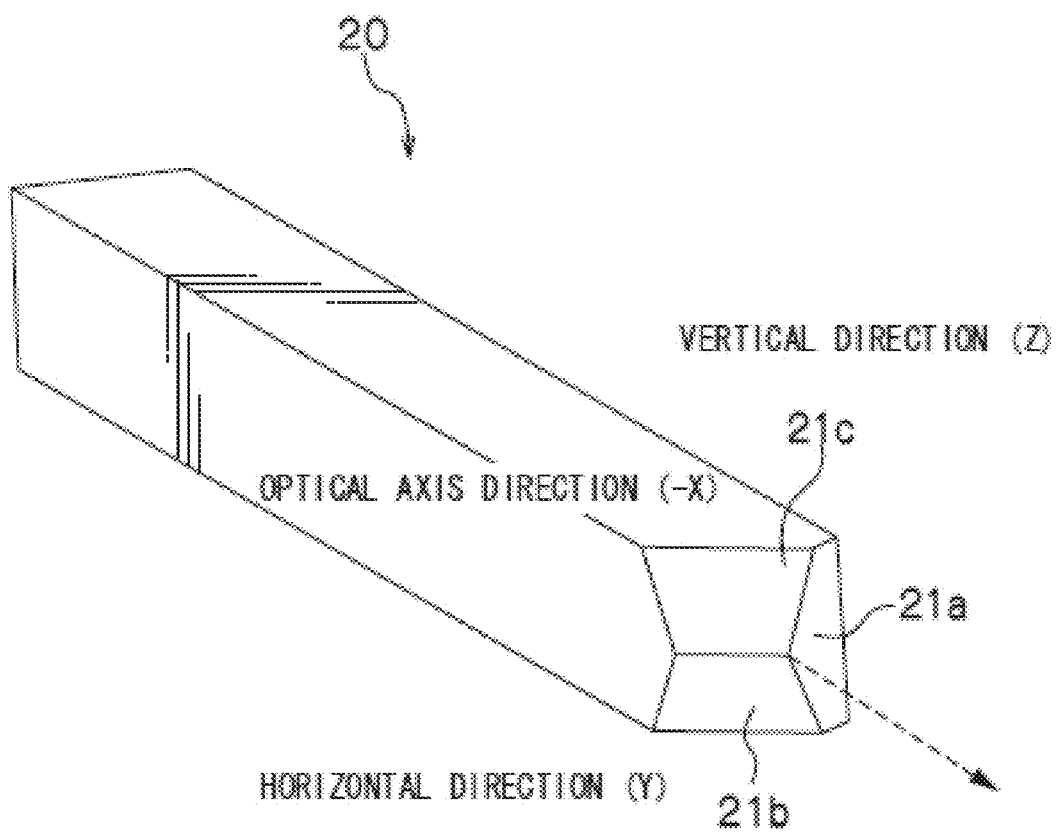
FIG. 11 is a perspective view of another embodiment of a reflex pin used to form the reflector for a vehicle as illustrated in FIG. 1 (a square pin)
Figure 12:
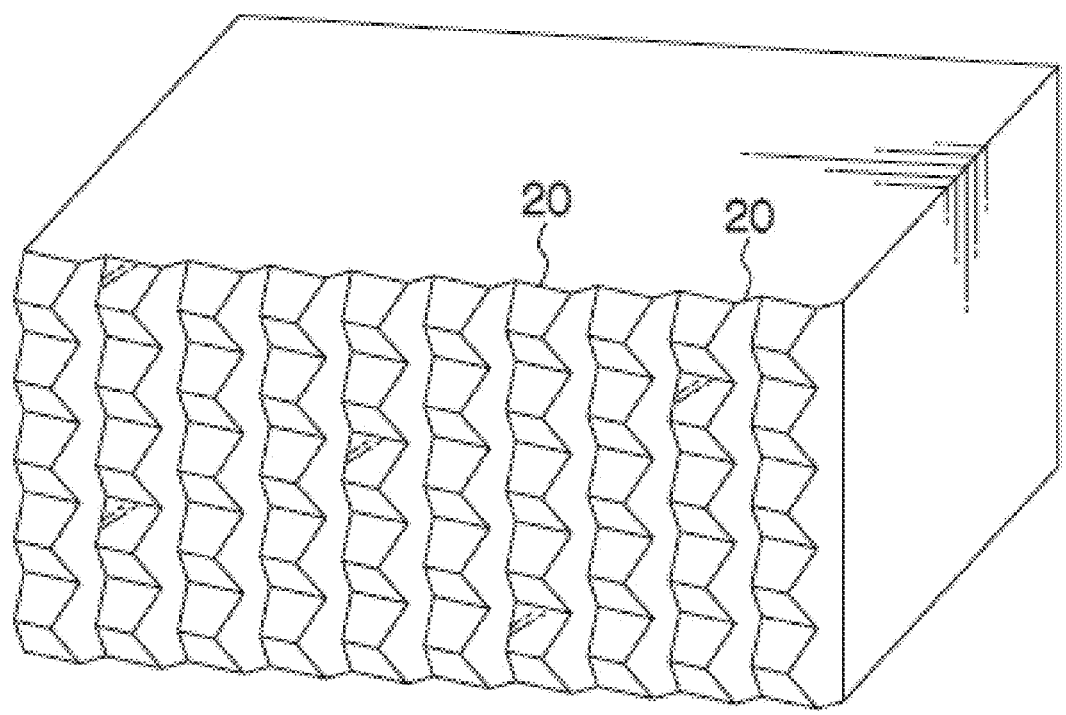
FIG. 12 is a perspective view of another embodiment of a reflex pin used to form the reflector for a vehicle as illustrated in FIG. 1 (a square pin)

FIG. 11 is an example in which a reflex pin 20 having a square sectional shape is formed by cutting both sides (horizontal sides) of the reflex pin 20 having a hexagonal sectional shape as illustrated in FIG. 10. This reflex pin 20 is assembled as illustrated in FIG. 12, for example, and is used to form a reflector for a vehicle in which retroreflective elements 11 are arranged in the same manner as illustrated in FIG. 1.

The reflex pin of FIG. 11 has the first inclination angle, the second inclination angle, the third inclination angle, the first rotational angle and the second rotational angle. Therefore, it is possible to increase the luminous intensity at measurement points by concentrating focusing points in the manner similar to with reflex pin of FIG. 10.

As described above, according to the reflex pin 20 of this embodiment, the five parameters (the first inclination angle α1, the second inclination angle α2, the third inclination angle α3, the first rotational angle β1, and the second rotational angle β2) are each set so that the angle conditions of ANG2>ANG3, ANG2>ANG1 and ROT1>ROT2>120 degrees are satisfied. Therefore, points P2 and P3 on both sides approach the topmost point P1 side to a greater extent than in related art (FIG. 16) (see FIG. 13B).

As a result of this, it becomes possible to form a retroreflective element 11 (a reflector 10 including a retroreflective element 11) which makes it possible to further increase the luminous intensity at the measurement points for obtaining the luminous intensity in accordance with a standard for reflex reflectors (SAE J594f) (Center: 10 DEG UP, 0 DEG, 10 DEG DOWN, Left20: 5 DEG UP, 0 DEG, 5 DEG DOWN, Right: 5 DEG UP, 0 DEG, 5 DEG DOWN on a vertical screen S arranged in a position about 30.5 meters away from the light source 30), to a greater extent than in related art (see FIG. 8C).

The above-described embodiments are illustrative only in all respects. The presently disclosed subject matter should not be construed as being limited thereby. The presently disclosed subject matter can be carried out in various other forms without departing from the spirit or principal features thereof.

What is claimed is:
1. A reflector for a vehicle comprising:
a plurality of retroreflective elements configured to retroreflect incident light obliquely upward at a prescribed angle with respect to a reference axis that is a central axis of each of the plurality of retroreflective elements, wherein the light becomes incident on the retroreflective elements parallel to the reference axis arranged along a horizontal direction,
the plurality of retroreflective elements each including:
a first reflection surface which is inclined at a first inclination angle ANG1 to the reference axis;
a second reflection surface which is inclined at a second inclination angle ANG2 to the reference axis and is formed in a first position reached after the second reflection surface is rotated from the first reflection surface through a first rotational angle ROT1 around the reference axis as a center; and
a third reflection surface which is inclined at a third inclination angle ANG3 to the reference axis and is formed in a second position other than the first position reached after the third reflection surface is rotated from the first reflection surface through a second rotational angle ROT2 around the reference axis as the center in a direction opposite to the second reflection surface,
wherein the first, second and third reflection surfaces are arranged in adjoining relation so as to substantially form corners of a cube, and
the first inclination angle ANG1, the second inclination angle ANG2, the third inclination angle ANG3, the first rotational angle ROT1 and the second rotational angle ROT2 satisfy the conditions expressed below:
ANG2 >ANG3;
ANG2 >ANG1; and
ROT1 >ROT2 >120 degrees.
2. The reflector for a vehicle according to claim 1, wherein the prescribed angle is 0.33 degrees.
3. The reflector for a vehicle according to claim 2,
wherein the first inclination angle ANG1 is 35.273 degrees ±0.0027 degrees,
the second inclination angle ANG2 is 35.310 degrees ±0.0027 degrees,
the third inclination angle ANG3 is 35.305 degrees ±0.0027 degrees,
the first rotational angle ROT1 is 120.07 degrees ±0.0027 degrees, and the second rotational angle ROT2 is 120.06 degrees ±0.0027 degrees.

4. The reflector for a vehicle according to claim 1, wherein the reflector includes a resin material.

5. The reflector for a vehicle according to claim 1, wherein the reflector includes a transparent material.

6. A reflex pin having a longitudinal axis extending parallel with a horizontal direction, comprising:
- an end portion configured to form a retroreflective element which retroreflects incident light obliquely upward at a prescribed angle with respect to a reference axis that is a central axis of the retroreflective element, wherein the light becomes incident on the retroreflective element parallel to the reference axis which is arranged substantially parallel with the horizontal direction,
- the end portion including:
- a first inclined surface which is inclined at a first inclination angle ANG1 with respect to a central axis of the reflex pin;
- a second inclined surface which is inclined at a second inclination angle ANG2 with respect to the central axis of the reflex pin and is formed in a first position reached after the second inclined surface is rotated from the first inclined surface through a first rotational angle ROT1 around the central axis of the reflex pin as a center; and
- a third inclined surface which is inclined at a third inclination angle ANG3 with respect to the central axis of the reflex pin and is formed in a second position other than the first position reached after the third inclined surface is rotated from the first inclined surface through a second rotational angle ROT2 around the central axis of the reflex pin as a center in a direction opposite to the second inclined surface,
- wherein the first, second and third reflection surfaces are arranged in adjoining relation so as to substantially form corners of a cube, and
- the first inclination angle ANG1, the second inclination angle ANG2, the third inclination angle ANG3, the first rotational angle ROT1 and the second rotational angle ROT2 satisfy the conditions expressed below:

ANG2 >ANG3;
ANG2 >ANG1; and
ROT1 >ROT2 >120 degrees.

7. The reflex pin according to claim 6, wherein the reflex pin includes a resin material.

8. The reflex pin according to claim 6, wherein the reflex pin includes a transparent material.

* * * * *